United States Patent
Javaherian et al.

(10) Patent No.: US 9,482,164 B2
(45) Date of Patent: Nov. 1, 2016

(54) ENGINE CONTROL USING CALCULATED CYLINDER AIR CHARGE

(71) Applicant: GM GLOBAL TECHNOLOGY OPERATIONS LLC, Detroit, MI (US)

(72) Inventors: Hossein Javaherian, Laguna Niguel, CA (US); Shifang Li, Shelby Township, MI (US); Yiran Hu, Shelby Township, MI (US); Jun-Mo Kang, Ann Arbor, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 14/672,321

(22) Filed: Mar. 30, 2015

(65) Prior Publication Data
US 2016/0290256 A1   Oct. 6, 2016

(51) Int. Cl.
| | |
|---|---|
| *F02D 23/00* | (2006.01) |
| *F02D 41/00* | (2006.01) |
| *F02D 41/18* | (2006.01) |
| *F02B 37/12* | (2006.01) |
| *F02D 9/00* | (2006.01) |
| *F02B 33/36* | (2006.01) |
| *F02B 33/38* | (2006.01) |

(52) U.S. Cl.
CPC .......... *F02D 41/0007* (2013.01); *F02B 37/12* (2013.01); *F02D 41/18* (2013.01); *F02B 33/36* (2013.01); *F02B 33/38* (2013.01); *F02D 9/00* (2013.01); *F02D 23/00* (2013.01)

(58) Field of Classification Search
CPC ...... F02D 41/0007; F02D 9/00; F02D 23/00; F02B 33/36; F02B 33/38

USPC .............. 701/103, 104, 102; 123/564, 559.1, 123/568.11
See application file for complete search history.

(56) References Cited

U.S. PATENT DOCUMENTS

| | | | | |
|---|---|---|---|---|
| 7,047,741 | B2* | 5/2006 | Gray, Jr. ................. | F01N 3/035 123/301 |
| 7,640,744 | B2* | 1/2010 | Rollinger ................. | B60K 6/48 60/605.1 |
| 8,141,358 | B2* | 3/2012 | Kolmanovsky ........... | F01L 9/04 123/399 |
| 8,251,049 | B2* | 8/2012 | Kang .................. | F02D 41/0007 123/676 |
| 2004/0061290 | A1* | 4/2004 | Gray, Jr. ................. | F01N 3/035 277/411 |

* cited by examiner

*Primary Examiner* — Mahmoud Gimie
(74) *Attorney, Agent, or Firm* — Quinn Law Group, PLLC

(57) ABSTRACT

A system includes a turbocharged engine, sensors, and a controller. The engine includes an engine intake manifold, air intake manifold, a compressor, a first aftercooler device, a throttle that admits cooled compressed air to the engine intake manifold, and cylinders. The sensors determine engine status signals and include a first manifold pressure (MAP) sensor positioned with respect to the first aftercooler device, a second MAP sensor positioned with respect to the engine intake manifold, a mass airflow (MAF) sensor positioned in the air intake manifold, a first manifold temperature (MAT) sensor positioned in the engine intake manifold, and a second MAT sensor positioned between the first aftercooler device and the throttle. The controller executes a method to calculate a cylinder air charge using an oxygen level of post-combustion gasses and the engine status signals, and controls an operation of the engine using the calculated air charge via engine control signals.

18 Claims, 2 Drawing Sheets

ENGINE CONTROL USING CALCULATED CYLINDER AIR CHARGE

TECHNICAL FIELD

The present disclosure relates to the control of an engine using a calculated air charge of the engine's cylinders.

BACKGROUND

Some internal combustion engines use a turbocharging system to increase engine power and efficiency. In a typical turbocharging system, a centrifugal gas compressor forces additional air into the combustion chambers of the engine's cylinders to increase the cylinder air charge, i.e., the concentration of fresh air supplied to the cylinders. The additional mass of oxygen-containing air improves the volumetric efficiency of the engine and allows the engine to generate more power during a given compression cycle of the combustion process.

The amount of air and fuel delivered to an engine is closely controlled such that an air-fuel ratio (AFR) approximates an ideal ratio or stoichiometric AFR. As is well known in the art, the stoichiometric AFR is 14.7:1 for a gasoline engine, meaning that each pound of gasoline injected into the engine's cylinders results in the combustion of 14.7 pounds of air. The terms "lean" and "rich" are used describe variations both above and below the stoichiometric AFR, respectively.

AFR control in an engine requires accurate knowledge of the cylinder air charge. Conventional techniques for estimating engine mass airflow may be less than optimal in a turbocharged engine, particularly in one using a high-pressure and/or a low-pressure exhaust gas recirculation (EGR) process. As is well known in the art, EGR processes involve the recirculation of a small portion of the engine's exhaust stream back into the cylinders. EGR processes are intended to help reduce overall tailpipe emissions. However, the diversion of exhaust gasses in an EGR process affects the amount of air in the air-fuel mixture. As a result, use of an EGR process in an engine can affect the overall accuracy of onboard AFR calculations and subsequent control techniques.

SUMMARY

The air charge of a given engine cylinder is typically estimated using the known volumetric efficiency of the engine. Such an approach may not be optimal in terms of accuracy, particularly when using an exhaust gas recirculation (EGR) process as noted above. As a result, extensive calibration is often required in an effort at correcting for inherent inaccuracies and adjusting for variance between different engines. The alternative approach disclosed herein is intended to improve upon such methods by using knowledge of the engine's unique air path dynamic equations and available engine status signals to directly calculate the cylinder air charge, and to thereafter use the calculated air charge to control an operation of the engine.

As part of the present method, a controller processes information from a set of engine sensors, including manifold pressure (MAP) sensors, a mass air flow (MAF) sensor, and manifold temperature (MAT) sensors, and calculates the cylinder air charge as the volume or amount of fresh air entering the various cylinders of the engine during an intake stage of a given compression cycle. Homogenous differentiation may be used as part of the present method to obtain cleaner/less noisy signals from the MAP sensors and an optional oxygen sensor. The estimated air charge is then used to control an operation of the engine, such as by adjusting throttle level and/or a fuel injection rate.

The present approach is based in part on the principle of mass balance. According to this principle, the mass airflow through a manifold ($\dot{M}_m$) of an engine such as engine 12 of FIGS. 1 and 2 is defined as the difference between the flow rate into the manifold, i.e., the throttle air flow ($\dot{m}_{in}$), and the flow of air out of the manifold, e.g., the cylinder air flow, ($\dot{m}_{out}$), with $\dot{M}_m = \dot{m}_{in} - \dot{m}_{out}$. In general, either for a cold start and/or for a warmed-up engine 12, the following relationship is valid:

$$\frac{\dot{P}_m}{P_m} = \frac{\dot{m}_{in} - \dot{m}_{out}}{M_m} + \frac{\dot{T}_m}{T_m}$$

where $P_m$ is the pressure of air in the manifold, $T_m$ is the temperature of the air, R is the ideal gas constant for air, and $M_m$ is the mass of air in the manifold. Because temperature is a slow varying process, the term $$\frac{\dot{T}_m}{T_m}$$

can be neglected, i.e., set to 0. Using this relationship, the flow out of the manifold $\dot{m}_{out}$ can be calculated as:

$$\dot{m}_{out} = \dot{m}_{in} - M_m \cdot \frac{\dot{P}_m}{P_m} = \dot{m}_{in} - c\dot{P}_m$$

where $$c = \frac{V_m}{R_m T_m}.$$

So, while the ideal gas law (PV=mRT) is used in the disclosed approach, the method 100 disclosed herein also incorporates knowledge of the airflow paths in the engine 12 to accurately estimate the cylinder air charge. Such airflow paths may include, depending on the embodiment, one or more exhaust recirculation (EGR) paths, and therefore the present approach is intended to more accurately calculate the amount of fresh air entering an engine's cylinders relative to prior art techniques.

In a particular embodiment, an example system includes an internal combustion engine, a controller, and multiple sensors. The controller is programmed to calculate fresh airflow into cylinders of the engine, i.e., the cylinder air charge noted above, via execution of steps of an associated method. The engine may optionally include a low-pressure and/or a high-pressure EGR path, although neither EGR path is required for the method to operate as intended. The controller is in communication with the sensors, which may include a pair of manifold absolute pressure (MAP) sensors, a mass airflow (MAF) sensor, and a plurality of manifold temperature (MAT) sensors positioned throughout the engine. Optionally, the sensors may include an intake oxygen (O2) sensor and an AFR sensor positioned downstream of a catalyst. As oxygen levels may be estimated in lieu of being measured, use of an O2 sensor is optional. Likewise, for stochiometric-gasoline engines the method may presume that all of the fuel is combusted, and thus may use a stoichiometric AFR of 14.7 in lieu of measuring the AFR downstream of the catalyst.

A system according to an example embodiment includes an engine, engine sensors, and a controller. The engine has an engine intake manifold, an air intake manifold that receives air from the ambient, a compressor that receives and compresses the received ambient air from the air intake manifold, a first aftercooler device that receives and cools the compressed air from the compressor, a throttle downstream of the first aftercooler device that admits the cooled compressed air to the engine intake manifold, and cylinders that receive the admitted cooled compressed air from the throttle for combustion therein. The engine sensors are operable for determining a set of engine status signals, including a first manifold pressure (MAP) sensor positioned with respect to the first aftercooler device, a second MAP sensor positioned with respect to the engine intake manifold, a mass airflow (MAF) sensor positioned in the air intake manifold, a first manifold temperature (MAT) sensor positioned in the engine intake manifold, and a second MAT sensor positioned between the first aftercooler device and the throttle. The controller is programmed to calculate an air charge of the cylinders of the engine using an oxygen level of the cooled compressed air and the set of engine status signals, and to control an operation of the engine using the calculated air charge via generation and transmission of a set of engine control signals.

A method for calculating cylinder air charge in the above described engine includes measuring a first and a second manifold pressure with respect to the first aftercooler device and the engine intake manifold using respective first and second manifold pressure (MAP) sensors, and also determining, via a MAF sensor, a mass airflow via a mass airflow (MAF) sensor positioned in the air intake manifold. The method further includes measuring a first manifold temperature via a first manifold temperature (MAT) sensor positioned in the engine intake manifold and a second MAT temperature via a second MAT sensor positioned between the first aftercooler device and the throttle.

Additionally, the method includes calculating, via a controller, an air charge of the cylinders using an oxygen level of post-combustion gasses of the engine and a set of engine status signals, including the measured manifold pressures, manifold temperatures, and mass air flow. The controller generates and transmits a set of engine control signals to the engine to thereby control an operation of the engine using the calculated air charge.

The above and other features and advantages of the present disclosure will be readily apparent from the following detailed description of the embodiment(s) and best mode(s) for carrying out the described disclosure when taken in connection with the accompanying drawings and appended claims.

DETAILED DESCRIPTION

Figure 1:
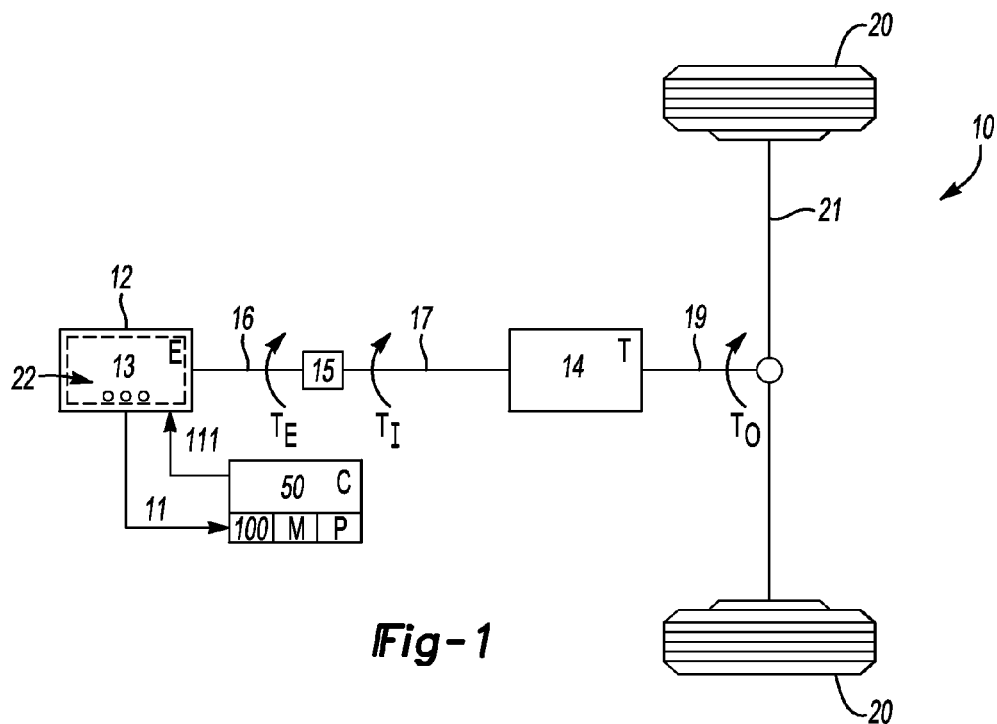
FIG. 1 is a schematic depiction of a system in the form of a vehicle having an engine with an example turbocharging system and a controller programmed to execute a method for estimating the cylinder air charge of the engine.

Referring to the drawings, wherein like reference numbers correspond to like or similar components throughout the several figures, a vehicle 10 is shown in FIG. 1 as an example system having an internal combustion engine (E) 12 with a turbocharging system 13. The vehicle 10 includes a controller (C) 50 that is programmed to calculate a cylinder air charge of the engine 12 and use the calculate cylinder air charge in the overall control of the engine 12, doing so via execution of a method 100 described below with reference to FIG. 3.

Figure 2:
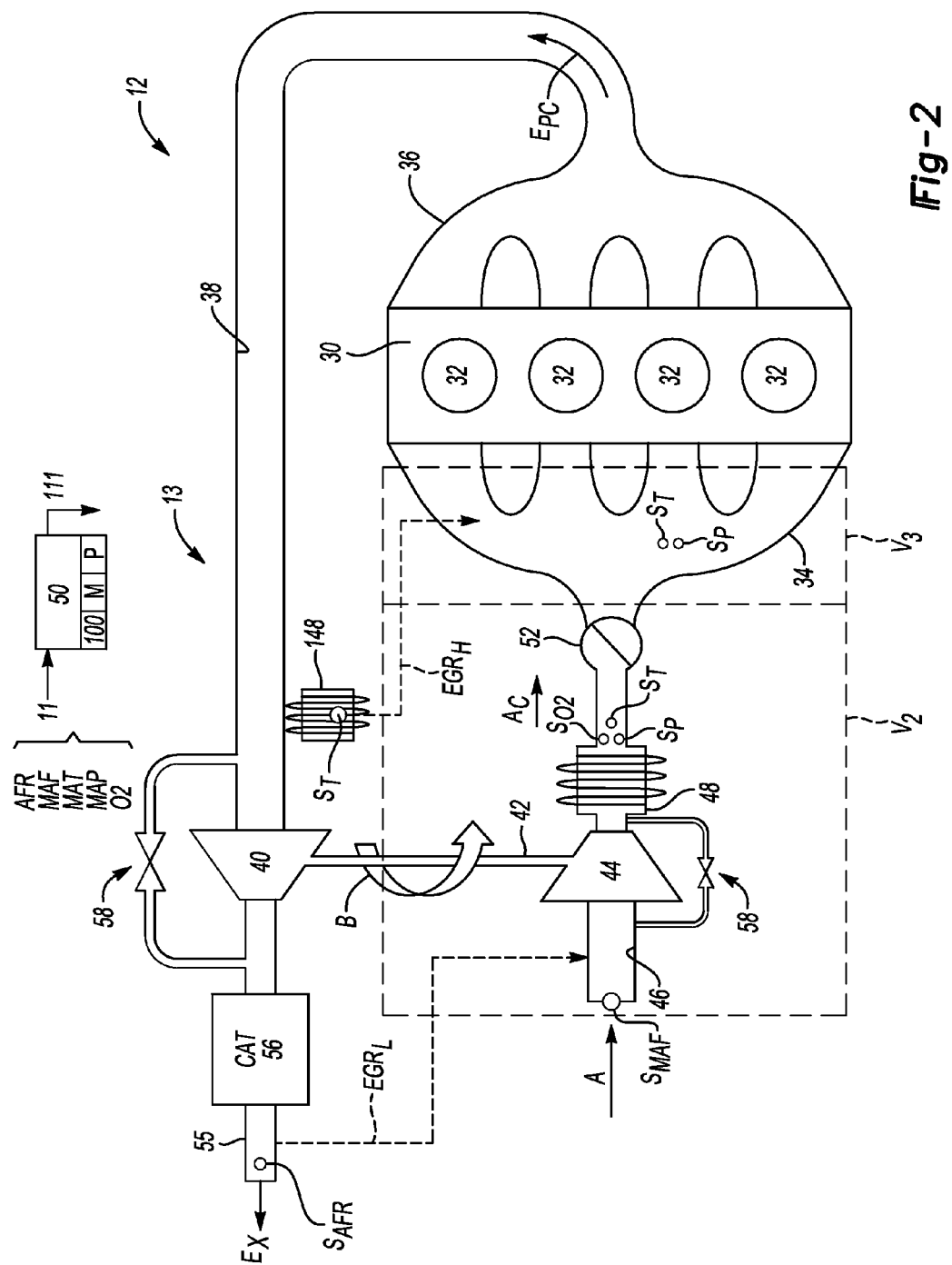
FIG. 2 is a schematic illustration of an example embodiment of an engine with associated turbocharging components usable as part of the vehicle shown in FIG. 1.

The engine 12, an example of which is shown in FIG. 2, may be embodied as a spark-ignition or compression-ignition design in which a desired air-fuel ratio is determined and used in the overall control of the engine 12. The vehicle 10 includes a transmission (T) 14 operatively connected to the engine 12 via a torque transfer device 15, for instance a hydrodynamic torque converter or an input clutch and damper assembly. Torque (arrow $T_E$) from the engine 12 drives a crankshaft 16 connected to the torque transfer device 15. The torque transfer device 15 in turn transfers input torque (arrow $T_I$) to an input member 17 of the transmission 14. Output torque (arrow $T_O$) is transmitted via an output member 19 of the transmission 14 to drive wheels 20 of the vehicle 10, e.g., via one or more drive axles 21.

As part of a method 100, the controller 50 considers mass airflow through various flow paths of the turbocharging system 13. As is well known in the art, in order to control vehicle emissions it is necessary to control the air-fuel ratio (AFR) and thereby attain catalytic conversion at a rate of high efficiency. Accurate AFR control requires, in turn, accurate estimation of the air charge entering the engine 12 under all engine operating modes. The controller 50 executes instructions embodying the method 100 to thereby estimate the cylinder air charge regardless of whether or not the engine 12 employs exhaust gas recirculation (EGR) functionality. An intended result of method 100 is a reduction in the calibration effort ordinarily required for such a turbocharging system 13.

The controller 50 of FIG. 1 is in communication with a plurality of engine sensors 22, shown schematically in FIG. 1 and described in further detail with reference to FIG. 2. The engine sensors 22 collectively output engine status signals (arrow 11) to the controller 50. Upon execution of the method 100, the controller 50 outputs engine control signals (arrow 111) to the engine 12 to thereby control the AFR, e.g., by modifying throttle level, fuel injection rates, and the like.

The controller 50 may be embodied as a digital computer device(s) having memory (M), at least some of which is tangible and non-transitory, and a processor (P). The memory may be any recordable volatile or nonvolatile medium, whether magnetic, optical, or the like, participating in the providing computer-readable data or process instructions. Instructions may be transmitted via cables, wires, fiber optics, or wirelessly using any suitable transmission media. The controller 50 includes any required hardware and circuitry, including for instance a high-speed clock or oscillator, analog-to-digital and digital-to-analog circuitry, input/output devices, signal conditioning and/or buffering circuitry, and the like. Any algorithms required by the controller 50 including those necessary for executing the method 100 may be stored in the memory and executed via the processor to provide the disclosed modeling and control functionality.

Referring to FIG. 2, the engine 12 may include a cylinder block 30 with a plurality of cylinders 32 arranged therein. The number of cylinders 32 may vary with the design of the engine 12. The cylinders 32 receive a mixture of air and fuel for subsequent combustion therein. Although omitted for illustrative simplicity, each cylinder 32 includes a respective reciprocating piston. Combustion chambers within the cylinders 32 are present between the bottom surface of a cylinder head and the tops of the pistons (not shown). As is well known by those skilled in the art, each of these combustion chambers receives a mixture of fuel and air during an intake stage of an engine cycle, with the mixture of air and fuel being combusted within the chamber to generate the input torque (arrow $T_I$) of FIG. 1.

The engine 12 also includes an engine intake manifold 34 and an engine exhaust manifold 36. Airflow into the engine 12 is directed to the various cylinders 32 via the engine intake manifold 34 and discharged from the cylinders 32 via the engine exhaust manifold 36. After the air-fuel mixture is burned inside a specific combustion chamber (not shown), post-combustion gasses (arrow $E_{PC}$) are exhausted from a given cylinder 32 via one or more exhaust valves (not shown). The post-combustion gasses (arrow $E_{PC}$) are directed via an exhaust pipe 38 to a turbine 40 of the turbocharging system 13. Rotation of the turbine 40 causes rotation of a turbine shaft 42 as indicated generally by arrow B.

The turbine 40 is connected to a compressor 44 via the turbine shaft 42, such that rotation of the turbine shaft 42 of FIG. 2 drives or powers the compressor 44. Fresh intake air (arrow A) is drawn into an air intake manifold 46 by operation of the compressor 44. A first intercooler 48 chills the compressed air downstream of the compressor 44 to thereby generate a flow of cooled, compressed air (arrow $A_C$). The cooled, compressed air (arrow $A_C$) is admitted to the engine intake manifold 34 via a throttle 52. This process repeats with each intake cycle of the engine 12 as is known in the art.

The engine 12 may include one or more exhaust gas recirculation (EGR) air flow paths $EGR_L$ and $EGR_H$, both of which are shown schematically in FIG. 2. Flow path $EGR_H$ directs a portion of the post-combustion gasses (arrow $E_{PC}$) through a second intercooler 148 to the engine intake manifold 34 as part of a high-pressure EGR process. Likewise, flow path $EGR_L$ may be used as part of a low-pressure EGR process, with another EGR valve (not shown) directing the post-combustion gasses (arrow $E_{PC}$) downstream of an oxidation catalyst (CAT) 56 back to an air intake manifold 46. A respective bypass valve 58 may be used to divert a calibrated portion of the post-combustion gasses (arrow $E_{PC}$) around the turbine 40 or compressor 44 as needed. While both high-pressure and low-pressure EGR processes are shown in FIG. 2, the method 100 may be employed in an engine 12 having neither or just one of these EGR options.

The controller 50 is in communication with the plurality of engine sensors 22 as shown in FIG. 1. Possible locations of the various engine sensors 22 are shown in FIG. 2. For example, a mass airflow (MAF) sensor ($S_{MAF}$) may be positioned with respect to the intake manifold 46 in the intake airflow (arrow A) and configured to measure and output a MAF signal (arrow MAF) to the controller 50 as part of the engine status signals (arrow 11). Additional engine sensors 22 may include MAP sensors $S_P$ positioned between the first intercooler 48 and the throttle 52, e.g., just upstream of the throttle 52, and within the engine intake manifold 34 itself. The controller 50 may also receive oxygen (O2) intake measurements via an optional O2 sensor ($S_{O2}$) or via modeling of the EGR flow as is known in the art.

Additionally, manifold temperature (MAT) sensors ($S_T$) may be positioned with respect to the second intercooler 148, between the first intercooler 48 and the throttle 52, and inside of the engine intake manifold 34. An optional AFR sensor ($S_{AFR}$) may be positioned just downstream of the catalyst 56 as shown, such as in an exhaust pipe 55, or this sensor may be omitted and a calibrated AFR used instead of this measurement, e.g., the stoichiometric point for the particular fuel being consumed by the engine 12. In this embodiment, the engine status signals (arrow 11) of FIG. 2 include all of the measurements performed by the various engine sensors 22.

For the purposes of executing the steps of method 100, the engine 12 of FIG. 2 is divided into separate control volumes $V_2$ and $V_3$. Control volume $V_2$ includes the air volume of the engine 12 on the intake side of the engine 12, i.e., the air volume from the air intake manifold 46 to just downstream of the throttle 52. Control volume $V_3$ is the air volume of the engine intake manifold 34. Both control volumes $V_2$ and $V_3$ are predetermined or calibrated values that are recorded in memory (M) of the controller 50 and readily accessible by the processor (P) as needed during execution of method 100.

Figure 3:
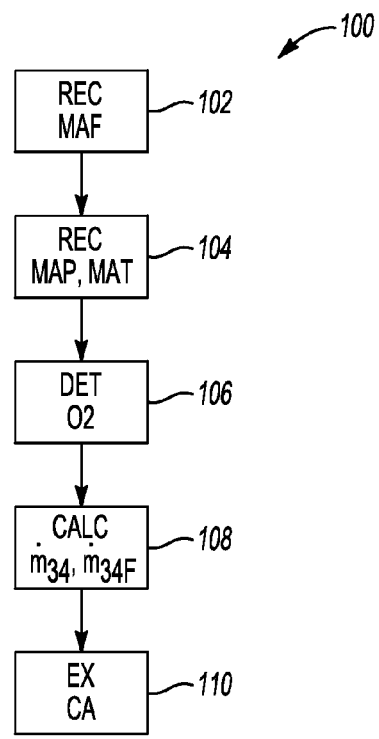
FIG. 3 is a flow diagram describing a method of controlling an operation of the engine of FIG. 2 using the cylinder air charge estimated as set forth herein.

Referring to FIG. 3, an example embodiment of the method 100 begins at step 102 wherein the controller 50 of FIGS. 1 and 2 receives the measured mass air flow from the MAF sensor, $S_{MAF}$, which is shown schematically in FIG. 2. This step is abbreviated as "REC MAF" in FIG. 3. This received value, which is part of the engine status signals (arrow 11), is measured well upstream of the cylinders 32 of the engine 12, for instance in close proximity to or within the air intake manifold 46. The method 100 then proceeds to step 104.

Step 104 includes receiving or otherwise determining the manifold pressures (MAP) via the MAP sensors $S_P$ and the manifold temperatures (MAT) from the MAT sensors $S_T$, both of which form part of the engine status signals (arrow 11) shown in FIG. 1. This step is abbreviated as "REC MAP, MAT" in FIG. 3. For the purpose of the mathematical relationships set forth below, the MAP sensors $S_P$ may measure two manifold pressures $P_2$ and $P_3$ in particular, i.e., separate manifold pressures just upstream of the throttle 52 and within or in close proximity to the engine intake manifold 34. The MAT sensors $S_T$ may measure manifold temperatures $T_2$, $T_3$, $T_8$, and $T_9$.

With reference to FIG. 2, the manifold temperatures $T_2$, $T_3$, $T_8$, and $T_9$ noted above are respectively determined at the inlet to the throttle 52, within the engine intake manifold 34, just downstream of the first intercooler 48, and at or in close proximity to the second intercooler 148. To reduce the number of MAT sensors $S_T$ used aboard the vehicle 10 and given the closeness of the manifold temperatures $T_2$ and $T_8$, only one sensor may be used between the first intercooler 48 and the throttle 52. In such an embodiment, the temperature $T_2$ may be considered to be equal to temperature $T_8$, and thus one value or the other may be used instead of both values. The method 100 proceeds to step 106 once the values of step 104 have been measured or otherwise determined.

At step 106, the method 100 includes determining O2 levels ("DET O2") just upstream of the throttle 52 of FIG. 2, either from the optional O2 sensor ($S_{O2}$) or via modeling as is known in the art. The mathematical approach described below applies to both conditions. The only difference is in how the controller 50 is informed of the O2 levels. The method 100 proceeds to step 108 once the O2 levels have been determined.

To reiterate, a core task being performed by the controller 50 with respect to method 100 is the calculation of the total mass of gas flowing into the cylinders 32 of the engine 12, otherwise known as the total cylinder air charge, and of how much of this mass is due to fresh air, i.e., fresh cylinder air charge. The part of the air mass that is not fresh air is due to the EGR process. Step 108 of FIG. 3 is therefore abbreviated as "CALC $\dot{m}_{34}, \dot{m}_{34F}$".

The primary challenge to calculating cylinder air charge using sensor information is that the measured air flow, from a mass air flow sensor for example, is not a direct measurement of cylinder air flow. The measured airflow must undergo filling and emptying dynamics in the various control volumes before reaching the cylinder. The method 100 disclosed herein makes use of the filling and emptying dynamics to remove the effect of the filling and emptying dynamics from measured air flow. The standard filling and emptying dynamics model for a control volume with volume V is given by:

$$\dot{P} = \frac{R_{air}\gamma}{V}(\dot{m}_{in}T_{in} - \dot{m}_{out}T_{out})$$

where P is the air pressure, $\dot{m}_{in}$ is the flow rate of air mass (burnt and fresh) into the volume, $T_{in}$ is the temperature of the air mass flowing into the volume, $\dot{m}_{out}$ is the flow rate of the air mass (burnt and fresh) out of the volume, $T_{out}$ is the temperature of the air mass flowing out of the volume, and γ is the ratio of specific heat for the air. Using this equation, $\dot{m}_{out}$ can be calculated as follows:

$$\dot{m}_{out} = \dot{m}_{in}\frac{T_{in}}{T_{out}} - \frac{\dot{P}V}{\gamma R_{air}T_{out}}$$

This allows the flow out of a given control volume to be calculated if the flow into the volume is measured.

The above calculation requires calculating the derivative of the manifold pressure. For fine tuning the pressure signal information, a clean pressure derivative may be calculated using a homogeneous differentiator as follows:

$$\dot{x}_1 = -\alpha|x_1-u|^{0.75}\text{sign}(x_1-u)+x_2$$

$$\dot{x}_2 = -\beta|x_1-u|^{0.5}\text{sign}(x_1-u)$$

$$u=P_c, x_2=\dot{P}_2$$

In these equations, α and β are calibrated constants. This approach can be used to help reduce signal noise in otherwise noisy pressure signals.

As part of step 108, the controller 50 of FIG. 1 considers the unique pressure dynamics in the engine intake manifold 34, i.e., $\dot{P}_3$, and also just upstream of the throttle 52, i.e., $\dot{P}_2$. If no turbocharger and no EGR is present, then MAF provides the mass air flow into the engine intake manifold. The flow and pressure relationship may be expressed as:

$$\dot{P}_3 = \frac{R\gamma}{V_3}(MAF^*T_8 - \dot{m}_{34}T_3)$$

where $\dot{m}_{34}$ is the mass airflow into the cylinders 32 that the controller 50 is ultimately trying to determine.

For turbocharged systems using no EGR process, this relationship may be expressed as follows:

$$\dot{P}_2 = \frac{R\gamma}{V_2}(MAF^*T_8 - \dot{m}_{23}T_2)$$

$$\dot{P}_3 = \frac{R\gamma}{V_3}(\dot{m}_{23}T_2 - \dot{m}_{34}T_3)$$

where $\dot{m}_{82}$ is the measured mass air flow in FIG. 2, $\dot{m}_{23}$ is the mass air flow across the throttle 52 into the engine air intake manifold 34, $\dot{m}_{34}$ is the mass airflow into the cylinders 32 that the controller 50 is ultimately trying to determine, and $T_2$ is the manifold temperature just downstream of the first intercooler 48.

When a low-pressure EGR process is used, the flow path of arrow $EGR_L$ of FIG. 2 is present. The $\dot{P}_3$ dynamics equation remains the same as that of a turbocharged system using no EGR process. However, the dynamics for $\dot{P}_2$ are modified as follows:

$$\dot{P}_2 = \frac{R\gamma}{V_2}((MAF + W_{EGR})T_8 - \dot{m}_{23}T_2)$$

When a high-pressure EGR process is used, the flow path of arrow $EGR_H$ of FIG. 2 is present. Use of such an EGR process requires modification of the $\dot{P}_3$ equation above as follows:

$$\dot{P}_3 = \frac{R\gamma}{V_3}(\dot{m}_{23}T_2 + \dot{m}_{53}T_9 + \dot{m}_{34}T_3)$$

i.e., the mass airflow due to EGR flow (arrow $EGR_H$) just upstream of the second intercooler 148 is considered, along with the temperature at the second intercooler 148 or slightly downstream of it. The dynamics for $\dot{P}_2$ is the same as the turbocharged system with no EGR process. The use of a high-pressure EGR process also affects the dynamics of burned gas fraction as set forth below.

For an engine configuration without EGR, only the pressure dynamics in the intake manifold need to be considered. Based on equation described previously, the fresh charge into the cylinder can be computed as:

$$\dot{m}_{34} = \dot{m}_{34F} = \frac{MAFT_1}{T_3} - \frac{\dot{P}_3V_3}{R_\gamma T_3}$$

For an engine configuration with a turbocharger but without any EGR process, the pressure dynamics in the control volume $V_2$ must be considered in addition to the pressure dynamics in the intake manifold (control volume $V_3$). As such the total cylinder air charge as well as the fresh cylinder air charge can be calculated as:

$$\dot{m}_{34} = \dot{m}_{34F} = \frac{MAFT_1}{T_3} - \frac{\dot{P}_2V_2 + \dot{P}_3V_3}{R_\gamma T_3}$$

As part of step 108, the controller 50 of FIGS. 1 and 2 also considers the burned gas fraction $f_2$, which may come from the optional oxygen sensor $S_{O2}$ of FIG. 2 (step 110) or via modeling. Burned gas fraction must be considered for system configurations with EGR. As is known in the art, a typical oxygen sensor actually measures the partial pressure of oxygen in a given air flow. From this, the controller 50 can readily determine how much oxygen was burned versus how much fresh air remains in a given air flow. The percentage of oxygen in ambient air is usually about 20.7%. Thus the control variable $\dot{m}_{34f}$ below tells the controller 50 how much fuel to inject, and the determination of the control variable $\dot{m}_{34f}$ is an ultimate control object of the method 100.

When using only a low pressure EGR process and the flow of arrow $EGR_L$ in FIG. 2, $f_2$ is set forth as follows:

$$\dot{m}_{61}(f_6 - f_2) = \dot{m}_{01} f_2 + \frac{P_2 V_2}{RT_2} f_2$$

where $\dot{m}_{61}$ is the mass airflow due to low-flow EGR (arrow $EGR_L$), i.e., from the outlet of the catalyst 56 to the air intake manifold, $V_2$ is the calibrated control volume of the compressor 44, the first intercooler 48, and the manifold volume between the first intercooler 148 and the throttle 52, and $\dot{m}_{01}$ is the measured mass air flow from the sensor $S_{MAF}$. Here, $$f_6 = \min\left(1, \frac{1+\lambda_S}{1+\lambda_6}\right)$$

where $\lambda_S$ is the wide-range stoichiometric air-fuel ratio measurement from the O2 sensor, $\lambda_6$ is the air-fuel measurement downstream of the catalyst 56, and $f_2$ is the burned gas fraction prior to the throttle 52, and where $$1 - f_2 = \frac{f_{O2}}{20.7\%}$$

with $f_{O2}$ being the fraction measured by the O2 sensor. For determining $\lambda_6$, a wide range air fuel ratio sensor such as sensor $S_{AFR}$ of FIG. 2 may be positioned at the output of the catalyst 56, or in the special case of a stoichiometric operating engine 12, the catalyst 56 may be assumed to be 100% efficient, and thus as a simplification, $\lambda_6$ may be assumed to be equal to $\lambda_S$, e.g., 14.7 for a gasoline engine 12.

When a low-pressure EGR process is used, the EGR flow rate ($W_{EGR}$) is determined and considered as follows:

$$W_{EGR} = \dot{m}_{61} = \frac{1}{f_6 - f_2}\left(MAF f_2 + \frac{P_2 V_2}{RT_2} f_2\right)$$

From this, the cylinder mass flow rate $\dot{m}_{34}$ which is a control objective of the controller 50, is determined as follows:

$$\dot{m}_{34} = \frac{(MAF + W_{EGR})T_2}{T_3} - \frac{\dot{P}_2 V_2 + \dot{P}_3 V_3}{R_y T_3}$$

where $V_3$ once again is the control volume of the engine intake manifold 34, i.e., a calibrated value. Once the value of $\dot{m}_{34}$ is known, the portion of fresh air in the cylinder mass flow rate can be determined as $\dot{m}_{34f} = (\dot{m}_{34})(1 - f_2)$.

When a high-pressure EGR process is used, the dynamic equations are modified slightly to account for the high-pressure EGR flow (arrow $EGR_H$). The burned gas fraction is determined as follows:

$$\dot{m}_{53}(f_5 - f_3) = \dot{m}_{23} f_3 + \frac{P_3 V_3}{RT_3} f_3$$

where $$1 - f_3 = \frac{f_{O2}}{20.7\%},$$

with $f_3$ being the burned gas fraction at the engine air intake. In this instance, the EGR flow is accounted for as:

$$W_{EGR} = \dot{m}_{53} = \frac{1}{f_5 - f_3}\left(\frac{f_3}{T_2} T_8 MAF - \frac{\dot{P}_2 V_2}{R\lambda}\right) + \frac{P_3 V_3}{RT_3} f_3$$

and $$\dot{m}_{34} = \frac{T_8 MAF + W_{EGRH} T_9}{T_3} - \frac{\dot{P}_2 V_2 + \dot{P}_3 V_3}{R_y T_3}$$

Similar to the case of low pressure EGR, once the value of $\dot{m}_{34}$ is known, the portion of fresh air in the cylinder mass flow rate can be determined as $\dot{m}_{34f} = (\dot{m}_{34})(1 - f_3)$.

Once the portion of fresh mass air flow $\dot{m}_{34}$ is known, the method 100 proceeds to step 110 at which point the controller 50 executes a control action ("EX CA") with respect to the engine 12 of FIG. 1. This is commanded by the controller 50 via a transmission of the engine control signals (arrow 111) of FIG. 1. For example, the controller 50 may compare the value of $\dot{m}_{34}$ to a calibrated threshold to determine if the amount of fresh air is sufficient, and then may adjust a position of the throttle 52 and/or change the rate of fuel injection to the cylinders 32 of FIG. 2 to thereby modify the air-fuel ratio. In this manner, the controller 50 of FIG. 1 uses any available sensor signals and the known engine air path dynamic equations as set forth above to directly calculate the cylinder air charge and thereafter control an operation of the engine 12 using the calculated cylinder air charge.

While some of the best modes and other embodiments for carrying out the claimed disclosure have been described in detail, various alternative designs and embodiments exist for practicing the disclosure as set forth in the appended claims. Furthermore, the embodiments shown in the drawings or the characteristics of various embodiments mentioned in the present description are not necessarily independent of each other. Rather, it is possible that the characteristics described in one or more of the disclosed example embodiments can be combined with one or more characteristics from other embodiments, resulting in other embodiments not described in words or by reference to the drawings. Accordingly, such other embodiments are intended to fall within the framework of the scope of the appended claims.

The invention claimed is:

1. A system comprising:
an engine having an engine intake manifold, an air intake manifold that receives air from the ambient, a compressor that receives and compresses the received ambient air from the air intake manifold, a first aftercooler device that receives and cools the compressed air from the compressor, a throttle downstream of the first aftercooler device that admits the cooled compressed air to the engine intake manifold, and cylinders that receive the admitted cooled compressed air from the throttle for combustion therein;
a plurality of engine sensors operable for determining a set of engine status signals, including a first manifold pressure (MAP) sensor positioned with respect to the first aftercooler device, a second MAP sensor positioned with respect to the engine intake manifold, a mass airflow (MAF) sensor positioned in the air intake manifold, a first manifold temperature (MAT) sensor positioned in the engine intake manifold, and a second MAT sensor positioned between the first aftercooler device and the throttle; and
a controller programmed to calculate an air charge of the cylinders of the engine using an oxygen level of the cooled compressed air and the set of engine status signals, and to control an operation of the engine using the calculated air charge via generation and transmission of a set of engine control signals.

2. The system of claim 1, wherein the controller is programmed to control the operation of the engine by changing an air-fuel ratio of the engine.

3. The system of claim 2, wherein the controller is programmed to change the air-fuel ratio of the engine by modifying an open/closed position of the throttle.

4. The system of claim 2, wherein the controller is programmed to change the air-fuel ratio of the engine by modifying a fuel injection rate of the cylinders.

5. The system of claim 1, wherein the engine includes an exhaust manifold, a turbine connected to the compressor, and a second aftercooler device positioned upstream of the turbine, wherein the turbine is driven via post-combustion gasses from the engine to thereby drive the compressor, and wherein a high-pressure exhaust gas recirculation flow path delivers a calibrated portion of the post-combustion gasses to the cylinders via the second aftercooler device.

6. The system of claim 1, wherein the engine includes an exhaust manifold, a turbine connected to the compressor, and a second aftercooler device positioned upstream of the turbine, the turbine is driven via post-combustion gasses from the engine to thereby drive the compressor, and a low-pressure exhaust gas recirculation flow path delivers a portion of the post-combustion gasses to the cylinders via the second aftercooler device.

7. The system of claim 6, further comprising a catalyst downstream of the turbine, wherein the plurality of engine sensors includes an air-fuel ratio sensor positioned downstream of the catalyst and operable to measure an air-fuel ratio of the post-combustion gasses.

8. The system of claim 1, wherein the controller is programmed to calculate a pressure derivative of pressure signals from the first and second MAP sensors via a homogeneous differentiator.

9. The system of claim 1, wherein the plurality of engine sensors includes an oxygen sensor positioned between the throttle and the first aftercooler device that is operable determine the oxygen level.

10. A method for calculating cylinder air charge in an engine having a plurality of cylinders, an engine intake manifold, an air intake manifold that receives air from the ambient, a compressor that receives and compresses the received ambient air from the air intake manifold, a first aftercooler device that receives and cools the compressed air from the compressor, a throttle downstream of the first aftercooler device that admits the cooled compressed air to the engine intake manifold, and cylinders that receive the admitted cooled compressed air from the throttle for combustion therein, the method comprising:
measuring a first and a second manifold pressure (MAP) with respect to the first aftercooler device and the engine intake manifold using respective first and second manifold pressure sensors;
determining a mass airflow (MAF) in the air intake manifold via a MAF sensor;
measuring a first manifold temperature (MAT) via a first MAT sensor positioned in the engine intake manifold and a second MAT temperature via a second MAT sensor positioned between the first aftercooler device and the throttle;
calculating, via a controller, an air charge of the cylinders using an oxygen level of post-combustion gasses of the engine and a set of engine status signals, including the measured manifold pressures, manifold temperatures, and mass air flow; and
generating and transmitting a set of engine control signals to the engine via the controller to thereby control an operation of the engine using the calculated air charge.

11. The method of claim 10, wherein transmitting the set of engine control signals includes changing an air-fuel ratio of the engine.

12. The method of claim 10, wherein changing the air-fuel ratio of the engine includes modifying a level of the throttle.

13. The method of claim 10, wherein changing the air-fuel ratio of the engine includes modifying a fuel injection rate of the cylinders.

14. The method of claim 10, wherein the engine further includes an exhaust manifold, a turbine connected to the compressor, and a second aftercooler device positioned upstream of the turbine, wherein the turbine is driven via post-combustion gasses from the engine to thereby drive the compressor, the method further comprising delivering a portion of the post-combustion gasses to the cylinders via a high-pressure exhaust gas recirculation flow path using the second aftercooler device.

15. The method of claim 10, wherein the engine includes an exhaust manifold, a turbine connected to the compressor, and a second aftercooler device positioned upstream of the turbine, wherein the turbine is driven via post-combustion gasses from the engine to thereby drive the compressor, the method further comprising delivering a portion of the post-combustion gasses to the cylinders in a low-pressure exhaust gas recirculation flow path via the second aftercooler device.

16. The method of claim 10, including a catalyst downstream of the turbine and an air-fuel ratio sensor positioned downstream of the catalyst, the method further comprising measuring an air-fuel ratio of the post-combustion gasses via the air-fuel ratio sensor.

17. The method of claim 10, further comprising calculating a pressure derivative of pressure signals from the MAP sensors via the controller using a homogeneous differentiator process.

18. The method of claim 10, including an oxygen sensor positioned between the throttle and the first aftercooler device, the method further comprising determining the oxygen level via the oxygen sensor.

* * * * *